2,966,508

CARBON FUNCTIONAL ORGANO-SILOXANE DIBASIC ACID HALOGEN ESTERS

Paul M. Kerschner, Mercerville, and Bertrand W. Greenwald, Woodcrest, N.J., assignors to Cities Service Research and Development Company, New York, N.Y., a corporation of New Jersey No Drawing. Filed May 27, 1959, Ser. No. 816,066

10 Claims. (Cl. 260—448.2)

This invention relates to new esters suitable as synthetic lubricants and hydraulic fluids. More particularly, this invention relates to new carbon functional organo-siloxane dicarboxylic acid halogen esters.

The new halo esters of the present invention may be generally characterized as those prepared by reacting one mol of a carbon functional organo-siloxane dibasic acid with two mols of a partially or completely halogenated alcohol. When we refer to a carbon functional acid we mean an acid in which the carboxyl group is attached directly to a carbon pattern as distinguished from silicon containing acids in which the carboxyl group is attached to a silicon atom through an oxygen atom. The latter bonding is a so-called silicate bond and is prone to hydrolysis in the presence of water. When used for lubricating purposes where water is often present the compounds which include such a linkage are unstable and therefore unsatisfactory for lubricating purposes. This unsatisfactory linkage is avoided by utilizing a carbon functional acid.

The new halogen esters of the present invention possess properties and characteristics which make them particularly suitable for use as lubricants and hydraulic fluids.

In our copending application Serial No. 812,145 filed May 11, 1959, we disclosed a series of new fluoroesters of a siloxane dicarboxylic acid which possessed unexpectedly superior lubricating properties over conventional mineral and silicon containing lubricating oils. As described in the application referred to, the presence of fluorine in the molecule substantially improves the wear properties of the lubricant. Improvement was also noted in the viscosity, pour point and wear characteristics. In addition, the fluoroesters described had a surprisingly high degree of stability to oxidation and demonstrated superior wear and lubricating properties.

We have now found, according to the present invention, that if certain of the fluorine atoms on the final ester product are substituted with chlorine the resulting compound possesses lubricating properties and characteristics vastly superior to the partially or completely fluorinated esters described. It has been found that if fluorine atoms are replaced by chlorine atoms so that the fluorine to chlorine atoms are present in the final product in the ratio of from 1:1 to 3:1 the product possesses wear properties and oxidation stability equal or superior to most commercially available mineral oil or synthetic lubricants.

The new compounds of the present invention are represented by the following general structure:

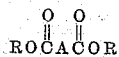

in which A represents a divalent group:

wherein R' represents alkyl radical having from 1 to 12 carbon atoms, t has a value of from 2 to 7, q has a value of from 1 to 6; and R represents the monovalent group:

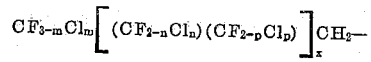

wherein $x=0$ to 6, $n$ and $p=0$ to 2, $m=0$ to 3, and the ratio of fluorine atoms to chlorine atoms in the radical is from 1:1 to 3:1.

In the foregoing general formula the divalent group represented by A is the residue of a carbon functional siloxane dicarboxylic acid. Such acids are known to those skilled in the art and may be prepared in several ways. One method of preparation is to subject a chlorinated alkyl disiloxane to a malonic ester synthesis. To obtain the siloxane acid the product of the synthesis is hydrolized and decarboxylated.

As will be more clearly shown in the examples which follow, the siloxane grouping appearing in the brackets in the divalent acid residue radical may be increased by treating a polysiloxane ester with concentrated sulfuric acid in the presence of octamethylcylclotetrasiloxane. This method of expanding the siloxane center of the dibasic acid is more specifically described in JACS 75, 6337, (1953). A more complete description of these acids and their method of preparation may be found in JACS 78, 2010, (1956).

The particular configuration of R' in the acid radical will, of course, depend on the structure of the material subjected to the malonic ester synthesis. In a similar manner if other methods of acid preparation are used starting materials incorporating different substituents would, of course, provide such structural modifications in the final halo ester product. R' as defined is preferably an alkyl group having from 1 to 12 carbon atoms including methyl, ethyl, propyl, butyl, pentyl, hexyl, heptyl, octyl, nonyl, undecyl and dodecyl. R' may also include alicyclic radicals such as cyclopentyl, cyclohexyl, cycloheptyl and cyclooctyl. Among the aryl radicals phenyl, diphenyl, naphthyl, α-methylnaphthyl, and betamethylnaphthyl may be present. Among the aralkyl radicals R' may represent tolyl and xylyl radicals. It is, of course, understood that within the same acid residue group represented by A the R' groups may be similar or dissimilar.

The R group in the foregoing generic structure has been defined as follows:

$$CF_{3-m}Cl_m(CF_{2-n}Cl_n)(CF_{2-p}Cl_p)_xCH_2-$$

This radical is the residue of the halogenated alcohol used in the esterification of the dicarboxylic acid. As has been previously described the improvement obtainable according to the present invention over that described and claimed in our copending application is made possible by substituting a limited number of chlorine atoms for the fluorine atoms present in the ester portion of the final product. Experience has shown that if less than 25% of the fluorine atoms present are substituted with chlorine atoms the resulting product has less extreme pressure lubricity. If an excess amount of chlorine, that is more than about 50% of the total halogen atoms in the molecule, is present the final product becomes corrosive under certain conditions and is therefore of limited value as a lubricant. On this basis a preferred ratio of fluorine to chlorine in the final product would be in the range of from 2:1 to 2.83:1.

Among the halogen alcohols found suitable in preparing the new compound of the present invention are the following: 1,1-dihydro-3,5,6-trichloroperfluorohexanol, 1,1-dihydro-3,5,7,8-tetrachloroperfluorooctanol, 1,1-dihydro-3,5,7,9,10-pentachloroperfluorodecanol, 1,1-dihydro-3,5,7,9,11,12-hexachloroperfluorododecanol, 1,1-dihydro-3,5,7,9,11,13,14-heptachloroperfluorotetradecanol and 1,1-dihydro-3,4-dichloroperfluorobutanol.

In addition, the following compounds can also be used: 1,1-dihydro-3,4-dichloroperfluorobutanol, 1,1-dihydro-4-chloroperfluorobutanol, 1,1-dihydro-4,4-dichloroperfluorobutanol, 1,1-dihydro-4,4,4-trichloroperfluorobutanol, 1,1-dihydro-3,5,6,6-tetrachloroperfluorohexanol, 1,1-dihydro-3,5,6,6-pentachloroperfluorohexanol, 1,1-dihydro-3,5,7,8,8-tetrachloroperfluorooctanol, 1,1-dihydro-8,8,8-trichloroperfluorooctanol, 1,1-dihydro-3,5,7,9,10,10-hexachloroperfluorodecanol and 1,1-dihydro-10,10,10-trichloroperfluorodecanol.

In carrying out the esterification reaction by which the new halogen esters of the present invention are prepared, it has been found that an acid catalyst will favorably influence the reaction rate. Suitable acid catalysts for this purpose include the following: sulfuric acid, p-toluene sulphonic acid, naphthalene sulfonic acid, hydrogen chloride, thionyl chloride, acetyl chloride, boron trifluoride and trifluoroacetic acid.

The new compounds having the foregoing general structure when utilized as synthetic lubricants will have a molecular weight in the range of from about 476 to about 2400, kinamatic viscosity to about 230 cs. at 100° F. and a pour point maximum of about −10° F.

The examples which follow illustrate the method by which the new esters of the present invention may be prepared:

EXAMPLE 1

To 278 grams (1 mol) of 4,4,6,6-tetramethyl-4,6-disila-5-oxanonanedioic acid, 1050 grams (3 mols) of 1,1-dihydro-3,5,6-trichloroperfluorohexyl alcohol is added in the presence of 250 ml. of toluene and 1 gram of concentrated sulfuric acid catalyst. These materials are placed in a 2000 ml. three-neck, round-bottom flask provided with a mechanical stirrer, a reflux condenser provided with a water trap and a thermometer. The reactants are refluxed together at a temperature of about 80° C. to 110° C. for a period of about 8 hours during which time water of esterification is removed as a toluene-water-alcohol azeotrope. Refluxing is continued until the acid number of the reactant mixture is reduced to a value of less than 2. Unreacted alcohol and toluene solvent are removed from the reaction mixture by distillation at atmospheric pressure. The crude product remaining after removal of alcohol and toluene is washed with water, washed with a 10% $Na_2CO_3$ solution, and finally washed with water to remove any unreacted acid and catalyst. The product recovered after distillation at reduced pressure is di(1,1-dihydro-3,5,6-trichloroperfluorohexyl)-4,4,6,6-tetramethyl-4,6-disila-5-oxanonanedioate.

EXAMPLE 2

In a manner similar to that described in Example 1 above, di(1,1-dihydro-3,5,7,8-tetrachloroperfluorooctyl) 4,4,6,6-tetramethyl-4,6-disila-5-oxanonanedioate was prepared by reacting 278 grams (1 mol) of 4,4,6,6-tetramethyl-4,6-disila-5-oxanonanedioic acid with 1398 grams (3 mols) of 1,1-dihydro-3,5,7,8-tetrachloroperfluorooctyl alcohol in the presence of 250 ml. toluene and 1 gram of concentrated sulfuric acid catalyst. After esterification was completed a product was recovered identified as cut 1 in Table I which follows.

In Table I data is provided on a series of acid esters similar to that described in Example 2 in which the siloxane nucleus is expanded to where $n$ has a value of from 2 through 5 respectively, which products correspond to the samples identified as cuts 1 to 5. These products identified by name below Table I were prepared as follows.

117.4 gm. (0.1 mol) of the ester prepared above is reacted with 7.6 grams (0.026 mol) of octamethylcyclotetrasiloxane in the presence of 0.975 cc. concentrated $H_2SO_4$. The reaction mixture is stirred at room temperature for 15 hours. After period of time 3.5 cc. of $H_{20}$ is added and the reaction mixture stirred an additional quarter hour. The aqueous layer is drawn off and the ester washed with water, 5% $NaHCO_3$ solution followed by water until the washings are neutral. The product is dried over anhydrous $MgSo_4$ and distilled to yield the 5 cuts mentioned above.

TABLE I

*Properties of carbon-functional organosilicon haloesters*

| Sample No. | Acid | Alcohol | Boiling Range, °C. | Pressure, μ Hg | Density @ 27° C. | R.I. @ 27° C. | Percent Si | Percent F | Percent C | Si:Halogen | Viscosity, cs. 100° F. | Viscosity, cs. 210° F. | V.I. | Pour Pt., °F. |
|---|---|---|---|---|---|---|---|---|---|---|---|---|---|---|
| Cut 1 | 1 | 11 | 80-128 | 16-18 | 1.5722 | 1.4101 | 5.09 | 37.4 | 20.8 | 0.008:1 | 73.40 | 7.24 | 47 | −60 |
| Cut 2 | 1 | 11 | 128-138 | 13-14 | 1.5468 | 1.4129 | 6.05 | 36.2 | 20.6 | 0.11:1 | 85.01 | 8.34 | 66 | −55 |
| Cut 3 | 1 | 11 | 138-141 | 13-14 | 1.5529 | 1.4142 | 6.54 | 35.3 | 20.3 | 0.12:1 | 84.09 | 9.20 | 92 | −60 |
| Cut 4 | 1 | 11 | 141-160 | 10-14 | 1.5271 | 1.4141 | 7.14 | 33.4 | 20.9 | 0.13:1 | 75.69 | 8.95 | 100 | −60 |
| Cut 5 | 1 | 11 | 160 |  | 1.4844 | 1.4151 | 9.2 | 31.4 | 18.7 | 0.18:1 | 73.58 | 9.73 | 118 | −50 |
|  | 1a | 10 | 88-108 | 18 |  |  | 61. | 33.5 | 21.5 | 0.11:1 | 31.92 | 5.01 | 87 | −65 |

Acid 1a = 4,4,6,6-tetramethyl-4,6-disila-5-oxanonanedioic acid.

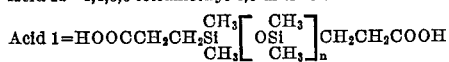

Acid 1 = HOOCCH$_2$CH$_2$Si(CH$_3$)$_2$[OSi(CH$_3$)$_2$]$_n$CH$_2$CH$_2$COOH
where $n$ equals 1 to 5
Alcohol 10 = 1,1 dihydro 3,5,6 trichloroperfluorohexanol.
Alcohol 11 = 1,1 dihydro 3,5,7,8 tetrachloroperfluorooctanol.

EXAMPLE 3

To 278 grams of 4,4,6,6-tetramethyl-4-6-disila-5-oxanonanedioic acid is reacted with 1746 grams of 1,1-dihydro-3,5,7,9,10-pentachloroperfluorodecanol in the presence of 150 ml. of toluene and 1 gram of p-toluene sulfuric acid catalyst under the conditions described in Example 1 above. This product is di(1,1-dihydro-3,5,7,9,10-pentachloroperfluorodecyl) 4,4,6,6-tetramethyl-4-6-disila-5-oxanonanedioate.

EXAMPLE 4

To 42.6 gm. (.1 mol) of 4,4,6,6,8,8.10,10-octamethyl-4,6,8,10-tetrasila-5,7,9-trioxatridecanedioic acid 69.6 gm. (.3 mol) of 1,1-dihydro-3,4-dichloroperfluorobutanol is added in the presence of about 250 ml. of toluene and 1 gm. of concentrated sulfuric acid catalyst. These materials are refluxed according to the method set forth in Example 1. The crude product remaining after removal of the alcohol toluene solvent is washed with water and further treated according to the method of Example 1 to provide the ester product di(1,1-dihydro-3,4-dichloroperfluorobutyl) - 4,4,6,6,8,8,10,10 - octamethyl - 4,6,8,10-tetrasila-5,7,9-trioxatridecanedioate.

EXAMPLE 5

To 27.8 gm. (.1 mol) of 4,4,6,6-tetramethyl-4-6-disila-5-oxanoneanedoic acid 69.9 gm. (.3 mol) of 1,1-dihydro-3,4-dichloroperfluorobutanol is added in the presence of toluene solvent and approximately 1 gm. of concentrated sulfuric acid catalyst. These materials are esterified according to the method of Example 1 to provide the ester product di(1,1 - dihydro-3,4-dichloroperfluorobutyl) 4,4,6,6-tetramethyl-4-6-disila-5-oxanonanedioate.

EXAMPLE 6

To 35.2 gm. (.1 mol) of 4,4,6,6,8,8-hexamethyl-4,6,8-trisila-5,7-dioxaundecanedioic acid 165.0 gm. (.3 mol) of 1,1 - dihydro - 3,5,7,9,10 - pentachloroperfluorodecanol is added. Solvent and acid catalyst are added and esterification conducted according to Example 1. After esterification has been completed an ester product is obtained of di(1,1-dihydro-3,5,7,9,10-pentachloroperfluorodecyl)-4,4,6,6,8,8 - hexamethyl - 4,6,8,-trisila-5,7-dioxaundecanedioate.

EXAMPLE 7

35.2 gm. (.1 mol) 4,4,6,6,8,8 - hexamethyl - 4,6,8-trisila-5,7-dioxaundecanedioic acid is reacted with 135.0 gm. (.3 mol) of 1,1-dihydro-3,5,7,8-tetrachloroperfluorooctanol to provide the ester di(1,1-dihydro-3,5,7,8-tetrachloroperfluorooctyl)-4,4,6,6,8,8-hexamethyl-4,6,8-trisila-5,7-dioxaundecanedioate. The reaction is carried out according to the method described in Example 1.

EXAMPLE 8

To 35.2 gm. (.1 mol) of 4,4,6,6,8,8-hexamethyl-4,6,8-trisila-5,7-dioxaundecanedioic acid 174.8 gm. (.3 mol) of 1,1 - dihydro - 3,5,7,9,10 - pentachloroperfluorodecanol is added. Esterification is carried out as described in Example 1 to provide the ester product di(1,1-dihydro-3,5,7,9,10-pentachloroperfluorodecyl)-4,4,6,6,8,8-hexamethyl-4,6,8-trisila-5,7-dioxaundecanedioate.

EXAMPLE 9

50.0 gm. (.1 mol) of 4,4,6,6,8,8,10,10,12,12-decamethyl-4,6,8,10,12-pentasila-5,7,9,11-tetraoxapentadecanedioic acid is reacted with 69.6 gm. (.3 mol) of 1,1-dihydro-3,4-dichloroperfluorobutanol according to the method of Example 1. After esterification is complete di(1,1-dihydro - 3,4-dichloroperfluorobutyl)-4,4,6,6,8,8,10,10,12,12 - decamethyl - 4,6,8,10,12-pentasila-5,7,9,11-tetraoxapentadecanedioate is obtained as a product.

In the table which follows data is provided demonstrating the improved properties and characteristics of the compounds of the present invention with simple fluoroesters previously considered satisfactory lubricants.

In Table II comparison is made between the halo esters of the present invention and simple fluoroesters having similar molecular weights but not including the chlorine component.

TABLE II

Comparison of Carbon-Functional Organosilicon Haloesters with Simple Fluoroesters

| Sample No. | Acid | Alcohol | Percent Halogen | Viscosity, cs. 100° F. | Viscosity, cs. 210° F. | V.I. | Pour Pt., °F. |
|---|---|---|---|---|---|---|---|
| Cut 4 | 1 | 11 | 54.3 | 75.69 | 8.95 | 100 | −60 |
| Cut 5 | 1 | 11 | 50.1 | 73.58 | 9.73 | 105 | −50 |
| A | 1a | 10 | 55.0 | 31.92 | 5.01 | 87 | −65 |
| NRL1* | 3 | 9 | 47.0 | 6.63 | 1.84 | 112 | 36 |
| NRL2* | 2 | 6 | 52.9 | 14.7 | 2.86 | 71 | 25 |
| NRL3* | 3 | 6 | 48.2 | 18.6 | 3.59 | 101 | 16 |
| NRL4* | 4 | 7 | 58.9 | 26.4 | 3.70 | 19 | −60 |
| NRL5* | 4 | 8 | 62.6 | 47.4 | 5.25 | 25 | 77 |

*Data taken from NRL Report 4493.

Acid 1 = see Table I.
Acid 1a = see Table I.
Acid 2 = adipic acid.
Acid 3 = sebacic acid.
Acid 4 = methylglutaric.
Alcohol 10 = see Table I.
Alcohol 11 = see Table I.
Alcohol 6 = 1,1,5-trihydroperfluoropentanol.
Alcohol 7 = 1,1,7-trihydroperfluoroheptanol.
Alcohol 8 = 1,1,9-trihydroperfluorononanol.
Alcohol 9 = 1,1-dihydroperfluorobutanol.

It will be noted in the foregoing table that the compounds of the present invention have improved V.I. and lower pour points than the corresponding synthetic fluoroesters identified.

The lubricating properties of the compounds of the present invention are demonstrated in the data which follows in Tables 3 and 4. The data in these tables was obtained on the standard Shell four ball testing apparatus. This test apparatus includes three rigidly held half inch metal balls submerged in a lubricant in a metal cup. A fourth ball of the same size is pressed into contact with the three fixed balls by an adjustable loading arm and allowed to rub for a fixed period of time. The contact points on the three stationary balls grow to circular scars as wear progresses. The average diameter of these scars in millimeters after the fixed period of operation at a particular speed and load is taken as the measure of wear. The temperature at which the test is conducted may be varied from room temperature to temperatures as high as 170° C. The data set forth in Table 3 was obtained with steel bearings (type 52−100 stainless) at a speed of 600 r.p.m. at 70° C. in a two hour period. The data in Table 4 was obtained with the same type of steel bearings at a speed of 1800 r.p.m. at 70° in three seconds with five drops of fluid.

TABLE III

Comparison of Wear Properties of Carbon Functional Organo-Silicon Fluorochloroesters With Petroleum Oil and Commercial Silicone Oil (X)

[Scar diameter in mm.]

| Sample No. | Cut 1 | Cut 2 | Cut 3 | Cut 4 | A | 100 Neut. Oil | X |
|---|---|---|---|---|---|---|---|
| Load, Kg.: | | | | | | | |
| 1 | 0.29 | 0.20 | 0.18 | 0.20 | 0.43 | 0.26 | 0.67 |
| 5 | | | | | 0.62 | 0.38 | 1.5 |
| 10 | 0.50 | 0.37 | 0.51 | 0.37 | 0.85 | 0.75 | 2.7 |
| 20 | 0.62 | 0.80 | 0.75 | 0.86 | 0.98 | 0.86 | |

X = Commercial Silicone No. 550.
A = defined in Table II.

TABLE IV

Extreme pressure wear

[Scar diameter in mm.]

| Sample No. | Cut 1 | Cut 2 | Cut 3 | Cut 4 | A | 100 Neut. Oil | X |
|---|---|---|---|---|---|---|---|
| Load, Kg.: | | | | | | | |
| 40 | | | | | 0.33 | 0.36 | 0.65 |
| 60 | | | 0.45 | | 0.38 | 1.9 | 1.1 |
| 80 | | | 0.48 | | 0.49 | 1.6 | 1.8 |
| 100 | | 0.40 | | | 0.57 | 2.3 | 2.6 |
| 120 | | 0.60 | | | 0.59 | | |
| 140 | | | 0.60 | | 0.63 | | |
| 160 | 0.63 | | 0.65 | | 0.67 | | |
| 180 | | 0.88 | 0.84 | 0.61 | 0.80 | | |
| 200 | 1.4 | 1.8 | 0.92 | | 1.1 | | |
| Seizure Load, Kg | 170 | 190 | 210 | 195 | 190 | 50 | 60 |

A = defined in Table II.

While compounds of the present invention provide very satisfactory lubrication under wide variety of conditions and in a superior manner to many of the presently available commercial synthetic lubricants and mineral oils, it may be desirable under certain conditions to improve some of the properties by utilizing various known additives with these compounds, for example, it may be desirable to add such agents as antioxidants, color stabilizers, viscosity improvers, pour point depressants and the like.

It is to be understood that the foregoing description and representative samples set forth are provided primarily to illustrate the invention and are not to be taken in any way as limiting the invention. It is intended that the invention be limited only by the claims appended hereto.

We claim:

1. As a new composition of matter a compound having the general formula

$$RO\overset{O}{\overset{\|}{C}}A\overset{O}{\overset{\|}{C}}OR$$

wherein A represents the divalent radical

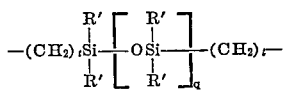

$$-(CH_2)_t\underset{R'}{\overset{R'}{Si}}\left[O\underset{R'}{\overset{R'}{Si}}\right]_q(CH_2)_t-$$

in which R' represents a radical selected from the group consisting of alkyl having from 1 to 12 carbon atoms, aryl, alkaryl, arylalkyl; $t$ has a value of from 2 to 7, $q$ has a value of from 1 to 6; and R represents the monovalent radical $$CF_{3-m}Cl_m[(CF_{2-n}Cl_n)(CF_{2-p}Cl_p)]_xCH_2-$$

in which $x$ has a value of from 0 to 6
$p$ has a value of from 0 to 2
$n$ has a value of from 0 to 2
$m$ has a value of from 0 to 3 and the ratio of fluorine atoms to chlorine atoms is maintained within the range of 1:1 to 3:1

2. As a new composition of matter the compound

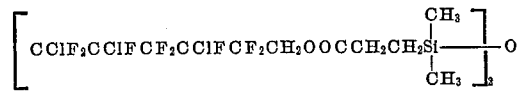

3. As a new composition of matter the compound

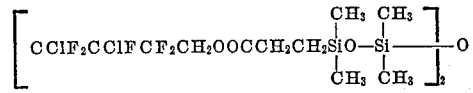

4. As a new composition of matter the compound

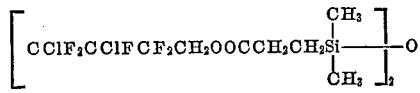

5. As a new composition of matter the compound

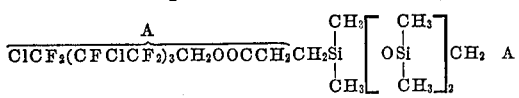

6. As a new composition of matter the compound

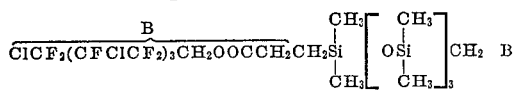

7. As a new composition of matter the compound

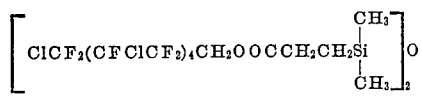

8. As a new composition of matter the compound

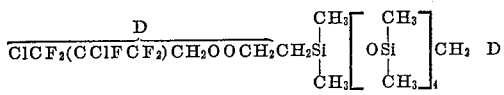

9. As a new composition of matter the compound

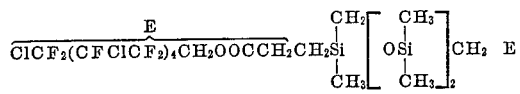

10. As a new composition of matter the compound

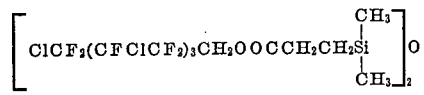

References Cited in the file of this patent
UNITED STATES PATENTS 2,691,032   Sommer _____ Oct. 5, 1954
2,710,877   Young et al. _____ June 14, 1955

OTHER REFERENCES

Lincoln et al.: "Ind. Eng. Chem.," vol. 28, No. 10 (Oct. 1936), pages 1191–7.

UNITED STATES PATENT OFFICE
CERTIFICATION OF CORRECTION

Patent No. 2,966,508                                                  December 27, 1960

Paul M. Kerschner et al.

It is hereby certified that error appears in the above numbered patent requiring correction and that the said Letters Patent should read as corrected below.

Columns 3 and 4, Table I, heading to column 10 thereof, for "Percent C" read -- Percent Cl --.

Signed and sealed this 13th day of June 1961.

(SEAL)
Attest:

ERNEST W. SWIDER                                      DAVID L. LADD
Attesting Officer                                        Commissioner of Patents